Patented Mar. 24, 1931

1,798,097

UNITED STATES PATENT OFFICE

ADOLF MENGER, OF KREFELD-BOCKUM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ADHESIVE

No Drawing. Application filed August 2, 1928, Serial No. 297,123, and in Germany August 10, 1927.

The invention relates to adhesives and in particular comprises adhesives containing a cellulose ester as fundamental constituent.

The known adhesives composed of a cellulose ester, a plasticizing and/or a softening agent and a solvent or solvent mixture therefor are not able to stick leather, felt, textile fabrics or the like to a smooth, say, a metallic surface unless the latter has been considerably roughened. Without preliminary roughening of the originally smooth surface the adherence of the objects to be stuck together is quite insufficient and in many cases roughening is impossible on account of the slight strength of the metallic surface.

I have found that the adhesive power of adhesives containing a cellulose ester as fundamental constituent and especially the adherence of such adhesives to smooth surfaces is considerably increased by adding a solid substance to the adhesive composition, in a finely divided state. In particular the addition of a finely divided filler having a fibrous structure has proved useful. Among the substances suitable for the purpose of my invention I mention: metallic powders (bronzes), saw dust, kaolin, talcum, flour, asbestos, etc. These substances are added to the adhesive cellulose ester composition in an amount of 10 percent and more (calculated to the adhesive composition). The composition of the adhesives which are mixed with the above-mentioned fillers may vary within wide limits and the quantity of fillers, too, may be changed to suit varying conditions. In all cases the adhesives containing a certain amount of fillers especially fillers of fibrous structure are excellently suitable to stick porous absorbent substances such as leather, felt, textile fabrics and the like to smooth surfaces e. g. metallic surfaces.

I prefer to add to my solutions ethyl acetanilide which acts in a similar manner as, for instance, camphor or the well-known camphor substitutes.

In order to illustrate my invention I give the following examples which represent typical compositions but I wish to be understood that my invention is not restricted thereto. The parts are by weight.

(1)

| | Parts |
|---|---|
| Nitrocellulose | 15 |
| Camphor | 6 |
| Acetone | 79 |
| Saw dust | 10 |

(2)

| | Parts |
|---|---|
| Acetyl cellulose | 12 |
| Tricresyl phosphate | 8 |
| Methyl alcohol | 20 |
| Ethyl acetate | 30 |
| Methyl acetate | 30 |
| Kaolin | 25 |

(3)

| | Parts |
|---|---|
| Nitrocellulose | 16 |
| Ethyl acetanilide | 10 |
| Acetone | 74 |
| Asbestos finely ground | 15 |

(4)

| | Parts |
|---|---|
| Waste photographic films | 20 |
| Ethyl acetate | 60 |
| Ethyl alcohol | 20 |
| Aluminium bronze | 10 |

(5)

| | Parts |
|---|---|
| Nitrocellulose | 12 |
| Ethyl acetanilide | 4 |
| Castor oil | 2 |
| Ethyl acetate | 20 |
| Methyl acetate | 20 |
| Methyl alcohol | 17 |
| Asbestos finely ground | 25 |

(6)

| | Parts |
|---|---|
| Waste photographic films | 14 |
| Ethyl acetanilide | 2 |

| | Parts |
|---|---|
| Castor oil | 2 |
| Tricresylphosphate | 3 |
| Ethyl acetate | 13 |
| Methyl acetate | 13 |
| Methyl alcohol | 6 |
| Acetone | 21 |
| Gasolene | 6 |
| Asbestos ground and levigated | 20 |

(7)

| | Parts |
|---|---|
| Nitrocellulose | 10 |
| Camphor | 4 |
| Tricresyl phosphate | 2 |
| Acetone | 50 |
| Butyl acetate | 20 |
| Saw dust | 14 |

In order to illustrate more fully the application of the new adhesives I give further some recipes for sticking porous substances to metallic surfaces:

(a) *Sticking leather to iron*

An adhesive in accordance with one of the foregoing examples, say Nr, 5, is brushed upon an iron sheet carefully cleansed and allowed to dry for 24 hours. The leather is brushed with any well known cellulose ester adhesive, allowed to dry (which requires about 2 hours) and then pressed to the iron sheet which was previously wetted by the same cellulose ester solution spread over the leather. After an hour's pressing the stuck objects are permitted to completely dry at ordinary pressure.

(b) *Sticking wood veneer to aluminium.*

The aluminium sheet carefully cleansed is brushed with an adhesive, say, according to Example 5 and allowed to dry for 24 hours and both are further treated as follows:

(α) The aluminium sheet is wetted with a known cellulose ester adhesive or a solvent capable of dissolving cellulose esters and pressed to the wood, or (β) The aluminium sheet and the wood are pressed together in a heated press for an hour at about 100° C. The wood slightly roughened is coated with a known cellulose ester adhesive without fillers.

I claim:

1. A viscous adhesive composition of high sticking power comprising nitrocellulose, ethyl acetanilide and a softening agent and a solvent therefor, containing at least 10% of ground asbestos.

2. A viscous adhesive composition of high sticking power comprising nitrocellulose, ethyl acetanilide, castor oil and a solvent therefor, containing at least 10% of ground asbestos.

3. A viscous adhesive composition comprising about 12 parts of nitrocellulose, 4 parts of ethyl acetanilide, 2 parts of castor oil, 57 parts of a solvent therefor and 25 parts of ground asbestos.

In testimony whereof I have hereunto set my hand.

ADOLF MENGER.